United States Patent

Sasaki

[11] Patent Number: 5,818,193
[45] Date of Patent: Oct. 6, 1998

[54] STEP MOTOR DRIVING METHOD AND APPARATUS FOR PERFORMING PWM CONTROL TO CHANGE A STEP DRIVE SIGNAL ON-DUTY RATIO

[75] Inventor: Mitsuo Sasaki, Atsugi, Japan

[73] Assignee: Unisia Jecs Corporation, Atsugi, Japan

[21] Appl. No.: 544,190

[22] Filed: Oct. 17, 1995

[51] Int. Cl.⁶ .................................................. H02P 8/00
[52] U.S. Cl. ......................................... 318/685; 318/254
[58] Field of Search .................................. 318/685, 646, 318/254, 138, 439

[56] References Cited

U.S. PATENT DOCUMENTS

| | | | |
|---|---|---|---|
| 4,473,786 | 9/1984 | Miyashita et al. | 318/561 |
| 4,574,225 | 3/1986 | Pershall et al. | 318/254 |
| 4,698,567 | 10/1987 | Gottwald et al. | 318/480 |
| 4,833,372 | 5/1989 | Kobayashi et al. | 318/696 |
| 4,959,601 | 9/1990 | Kikugawa et al. | 318/696 |
| 5,063,338 | 11/1991 | Capel et al. | 318/685 |
| 5,182,507 | 1/1993 | Ishii et al. | 318/685 |
| 5,231,343 | 7/1993 | Nakamura | 318/696 |
| 5,266,879 | 11/1993 | Onishi | 318/685 |
| 5,360,089 | 11/1994 | Nakamura et al. | 188/299 |
| 5,446,358 | 8/1995 | Nakata | 318/696 |
| 5,572,105 | 11/1996 | Nojima et al. | 318/696 |

FOREIGN PATENT DOCUMENTS

| | | |
|---|---|---|
| 0 461 066 | 12/1991 | European Pat. Off. |
| 2 550 668 | 2/1985 | France . |
| 30 20 425 | 12/1981 | Germany . |
| 43 17 134 | 11/1993 | Germany . |
| 4-58790 | 2/1992 | Japan . |

*Primary Examiner*—Jonathan Wysocki
*Attorney, Agent, or Firm*—Foley & Lardner

[57] ABSTRACT

A step motor driving method employing an electric circuit operable on a supply voltage applied thereto for generating a step drive signal having a variable on-duty ratio to drive the step motor. A PWM control is made to change the step drive signal on-duty ratio. The the step drive signal on-duty ratio is increased to compensate for a supply voltage drop.

3 Claims, 10 Drawing Sheets

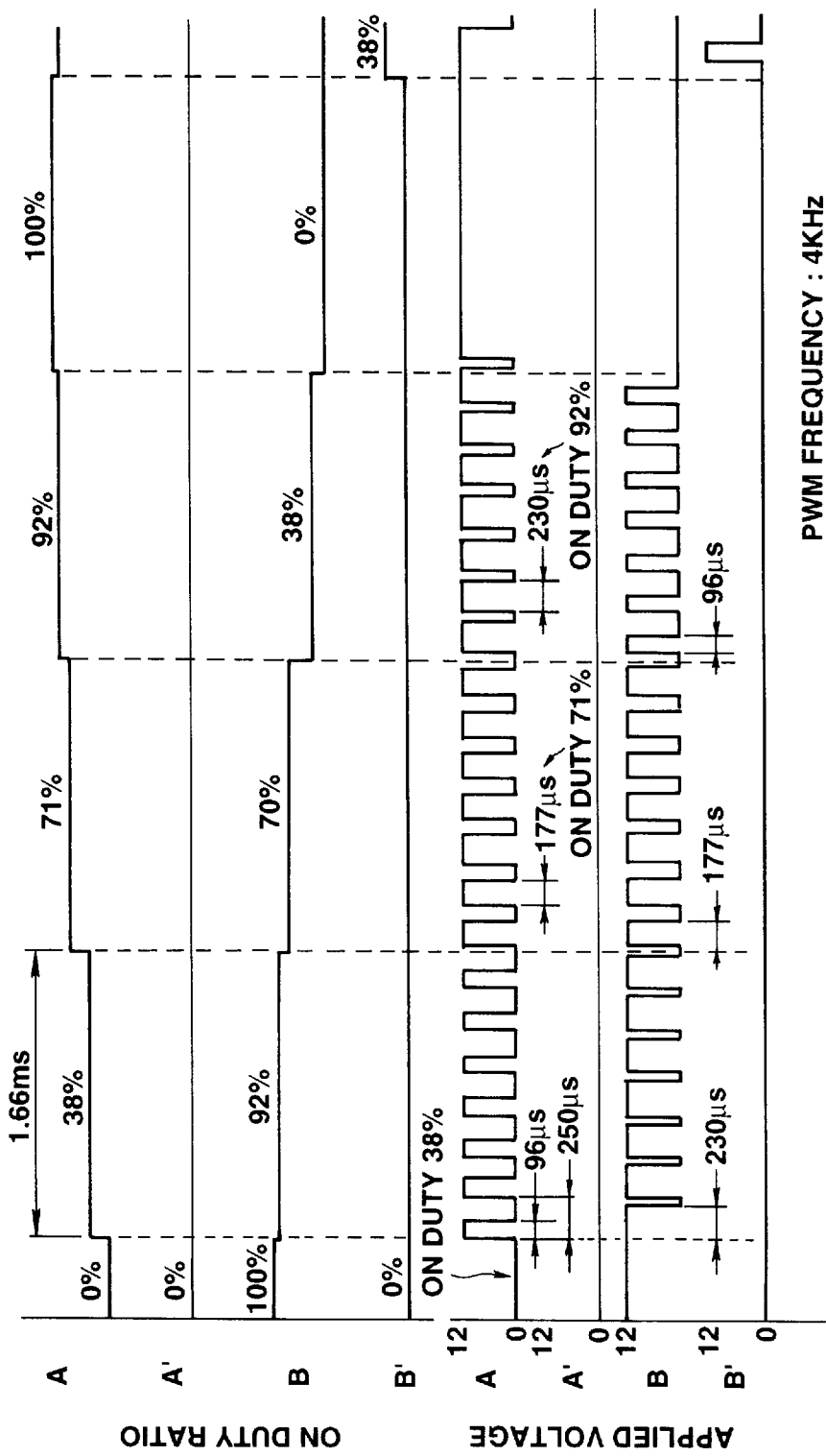

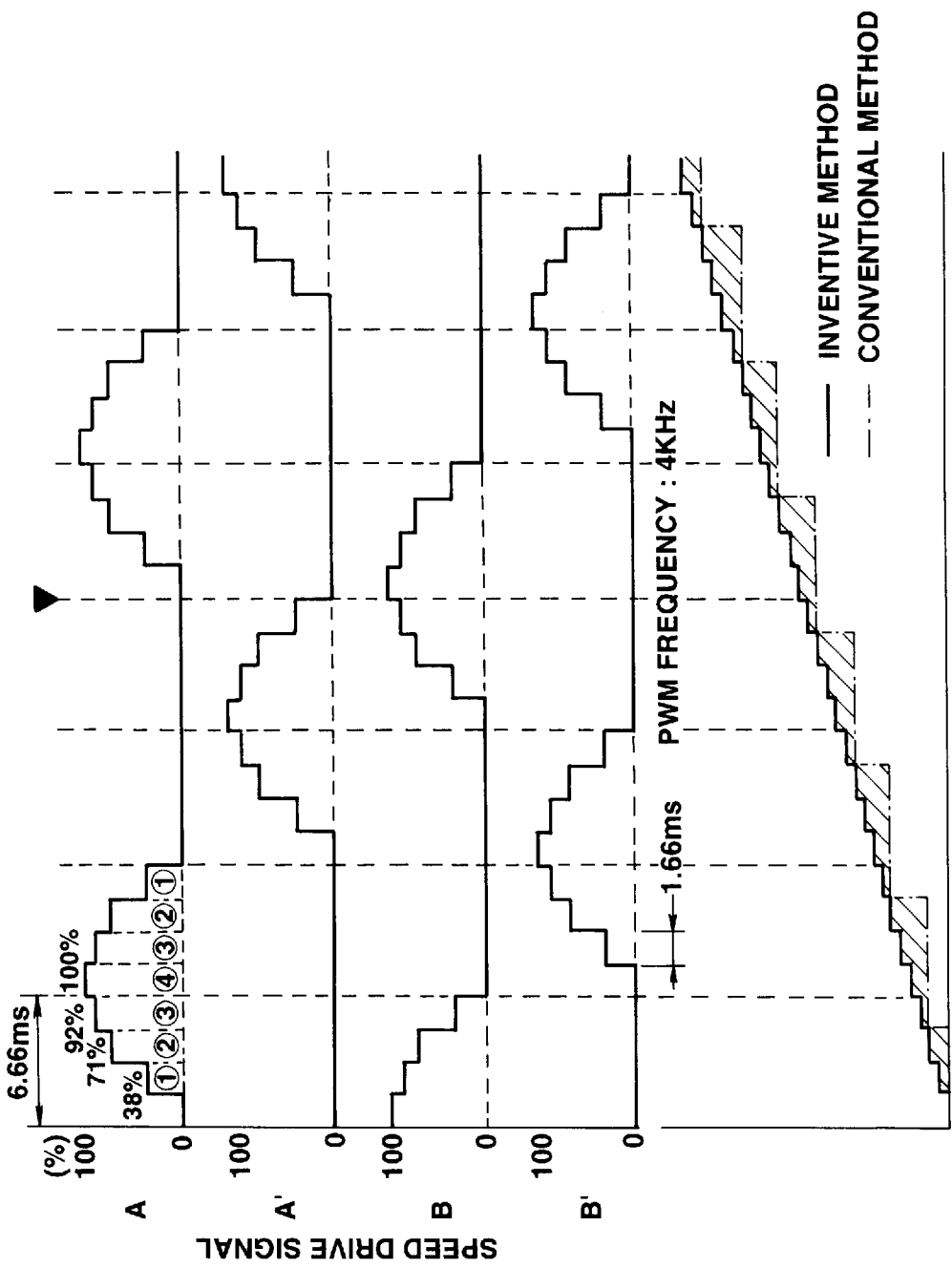

FIG.10
| P \ V | 8≤V<9 | 9≤V<10 | 10≤V<11 | 11≤V<12 | 12≤V<13 | 13≤V<14 | 14≤V<15 |
|---|---|---|---|---|---|---|---|
| 1 | 100 | 65 | 60 | 55 | 38 | 38 | 38 |
| 2 | 100 | 85 | 83 | 78 | 71 | 71 | 71 |
| 3 | 100 | 95 | 94 | 93 | 92 | 92 | 92 |
| 4 | 100 | 100 | 100 | 100 | 100 | 100 | 100 |
ON DUTY (%)
FIG.11
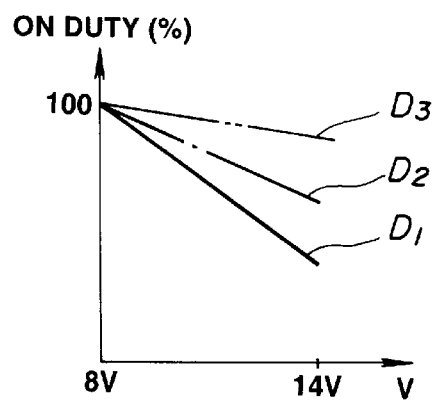
FIG.12
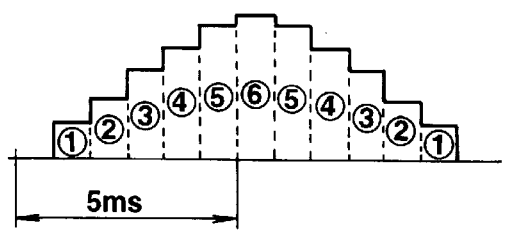

STEP MOTOR DRIVING METHOD AND APPARATUS FOR PERFORMING PWM CONTROL TO CHANGE A STEP DRIVE SIGNAL ON-DUTY RATIO

BACKGROUND OF THE INVENTION

This invention relates to a method of driving at least one step motor operable under a PWM control.

It has been proposed, in Japanese Patent Kokai No. 4-58790, to minimize settling which may occur due to a sudden step motor motion so as to reduce vibrations during stepped operation of the step motor by a PWM (pulse width modulation) control to permit gradual changes in the on-duty ratio of the drive signal applied to drive the step motor. However, Such a PWM control is made in a manner to provide a gentle or slow degree to which the drive current rises by limiting the period of time during which the drive signal remains in its on state. For this reason, the average value of the drive current decreases and the step motor torque decreases. The drive torque will further decrease to cause erroneous step motor operation when the supply voltage on which the step motor drive circuit operates drops during the PWM control.

SUMMARY OF THE INVENTION

It is a main object of the invention to provide an improved step motor driving method which can avoid the danger of erroneous step motor operation which may occur when the supply voltage drops.

Another object of the invention is to provide an improved step motor driving method which can minimize vibrations during step motor operation.

Still another object of the invention is to provide an improved step motor driving method which can eliminate the disorder on the damping force characteristics.

There is provided, in accordance with the invention, a method for driving at least one step motor. The step motor driving method comprises the steps of:

with an electric circuit operable on a supply voltage applied thereto for generating a step drive signal having a variable on-duty ratio to drive the step motor, performing a PWM control to change the step drive signal on-duty ratio;

monitoring the supply voltage to detect a drop in the supply voltage; and increasing the step drive signal on-duty ratio in response to detection of a supply voltage drop.

BRIEF DESCRIPTION OF THE DRAWINGS

The invention will be described in greater detail by reference to the following description taken in connection with the accompanying drawings, in which:

FIG. 4A is a graph showing step drive signal on-duty ratios specified in a basic drive pattern for the respective step periods of time;

FIG. 4B shows the waveforms of the step drive signal in the basic drive pattern for the respective step periods of time;

FIG. 5A is a graph showing step drive signal on-duty ratio specified in the basic drive pattern for the respective step periods of time;

FIG. 5B is a graph used in explaining the operation of the step motor driven in the basic drive pattern;

FIG. 10 shows a look-up table programmed into a computer for calculating the step drive signal on-duty ratio;

FIG. 11 is a graph which defines constants used in calculating the step drive signal on-duty ratio; and FIG. 12 is a graph showing a modified form of the step motor driving method where the half cycle of the step drive signal is divided into eleven step periods of time.

DETAILED DESCRIPTION OF THE INVENTION

Figure 1:
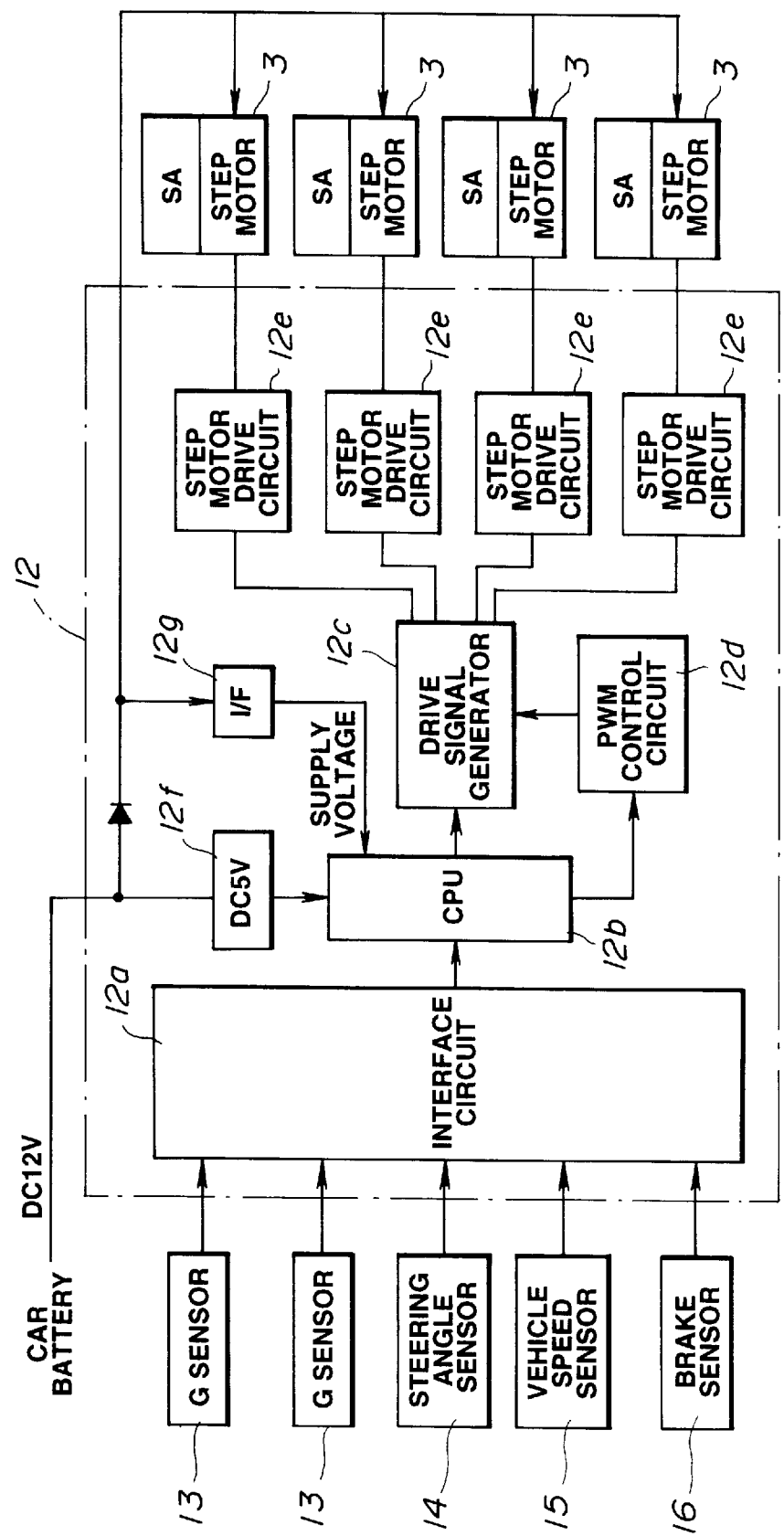
FIG. 1 is a schematic diagram showing an automotive vehicle suspension control system to which the method of the invention is applicable.

With reference to the drawings and in particular to FIG. 1, there is shown a schematic diagram of an automotive vehicle suspension control system to which the method of the invention is applicable. The suspension control system is shown as including a control unit 12 for driving step motors 3 in a manner to realize optimum damping coefficients for the associated shock absorbers SA each of which is provided between a sprung mass (vehicle body) and an unsprung mass (tire wheel). The control unit 12 includes an interface circuit 12a, a central processing unit (CPU) 12b, a drive signal generator circuit 12c, a PWM control circuit 12d and drive circuits 12e. The central processing unit 12b calculates desired damping coefficient values to be provided for the respective shock absorbers SA. These calculations are made based on signals fed thereto through the interface circuit 12a from various sensors including acceleration sensors (G sensors) 13, a steering angle sensor 14, a vehicle speed sensor 15 and a brake sensor 16. The central processing unit 12b transfers the control word specifying the calculated damping coefficient value to the drive signal generator circuit 12c which thereby produces a step drive signal to the step motor drive circuits 12e for driving a corresponding one of the step motors 3 to its desired or target step position. The PWM control circuit 12d divides the cycle of the step drive signal into a plurality of (in the illustrated case four) step periods of time and it performs a PWM control to increase or decrease the on-duty ratio of the step drive signal for each of the step periods of time.

Figure 2:
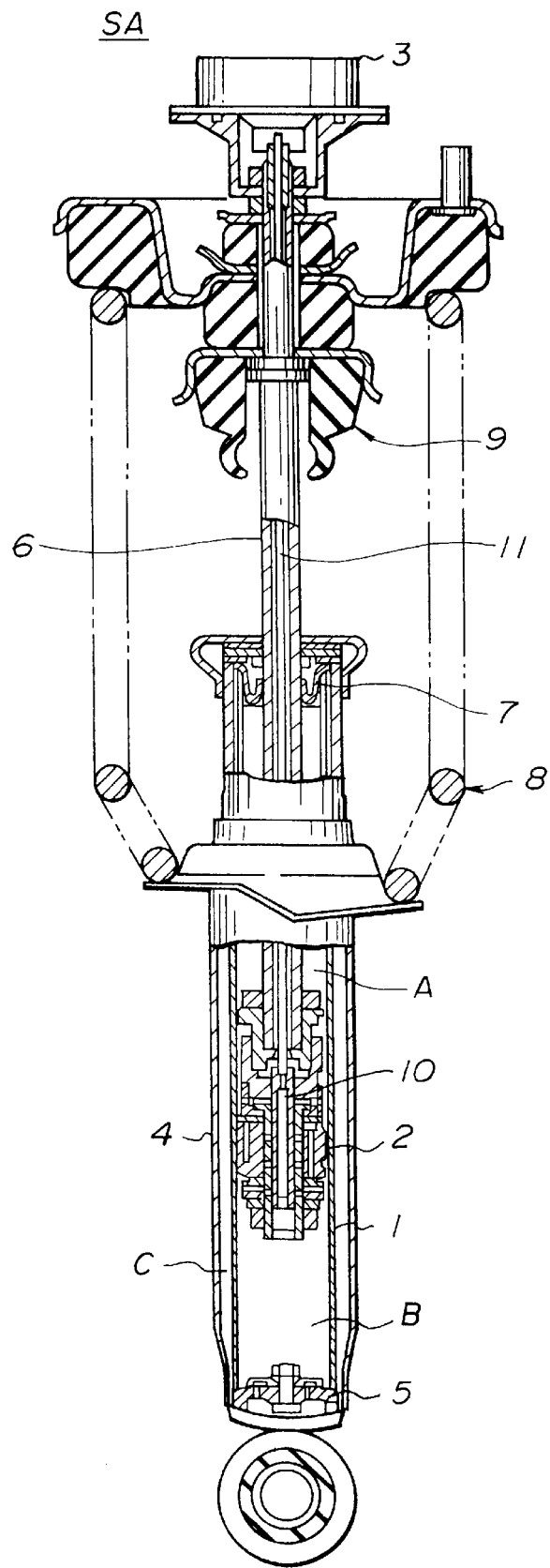
FIG. 2 is a sectional view of a shock absorber which may be used with the automotive vehicle suspension control system of FIG. 1.
Figure 3:
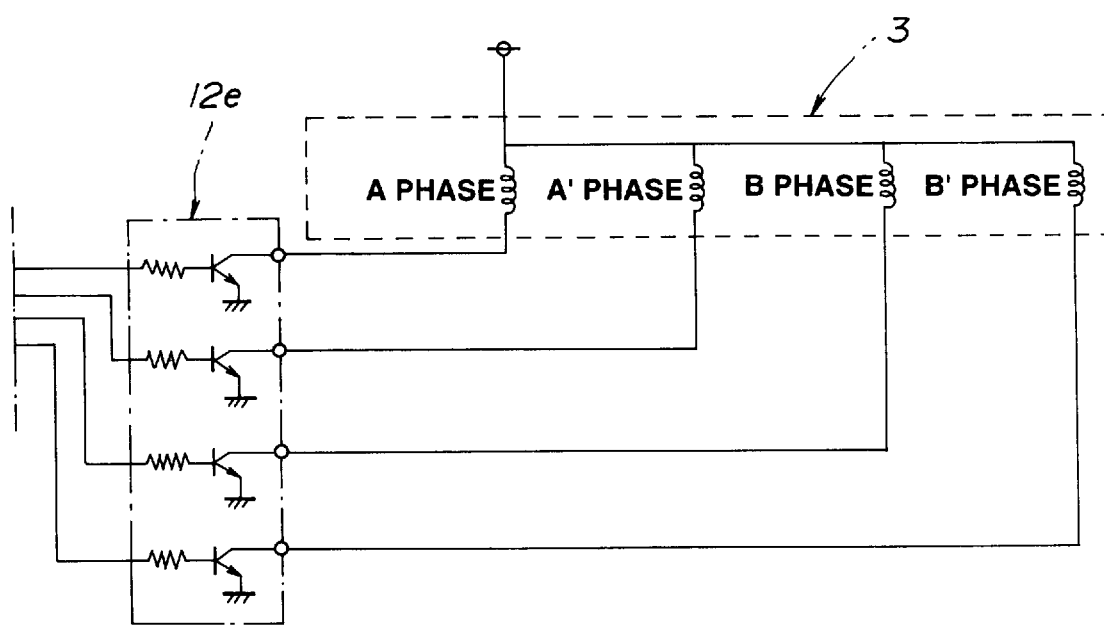
FIG. 3 is a circuit diagram showing a drive circuit connected to a step motor used in the automotive vehicle suspension control system of FIG. 1.

Referring to FIG. 2, there is shown a variable damping force type shock absorber which may be used with the suspension control system. The shock absorber SA includes a cylinder 1 and a piston 2 mounted for reciprocal motion within the cylinder 1. The piston 2 defines upper and lower chambers A and B on the opposite sides thereof. An outer envelop 4 is placed to surround the cylinder 1 so as to define a reservoir C along therewith. A base 5 is provided to separate the reservoir C from the lower chamber B. A piston rod 6 is coupled to the piston 2 for sliding movement. The sliding movement of the piston rod 6 is guided by a guide member 7. A suspension spring 8 is seated between the outer envelop 4 and the vehicle body. The numeral 9 designates a bumper rubber member (or bushing) 9. The piston rod 6 contains a rotary valve 10 which is rotated in a stepped fashion, through the control rod 11 by the step motor 3 mounted on the upper end of the shock absorber SA, to permit the shock absorber SA to provide a variable damping force. The step motor 3 may be of the unipolar 4-phase driven 2—2 phase excitation type as shown in FIG. 3.

Returning to FIG. 1, the step motors 3 are supplied with power from a car battery (DC 12 volts). The car battery is also connected to a voltage transformer (DC 5 volts) 12f from which the central processing unit 12b is supplied with power. The voltage applied to the step motors 3 is sensed by a voltage detector 12g. The detected voltage is fed from the voltage detector 12g to the central processing unit 12b. The central processing unit 12b selects one of a plurality of drive patterns each specifying stepped changes in the on-duty ratio of the step drive signal fed from the drive signal generator circuit 12c to each of the step motor drive circuits 12e and produces a command signal specifying the selected drive pattern to the PWM control circuit 12d. In the illustrated case, the drive patterns include a basic drive pattern, a first corrected drive pattern and a second corrected drive pattern. This selection is made based on the voltage detected by the voltage detector 12g. The central processing unit 12b selects the basic drive pattern when the voltage applied to the step motors 3 is equal to or greater than DC 12 volts, the first corrected drive pattern when the voltage applied to the step motors 3 is in the range of DC 9 volts and DC 12 volts, and the second corrected drive pattern when the voltage applied to the step motor 3 is in the range of DC 8 volts to DC 9 volts.

Figure 6A:
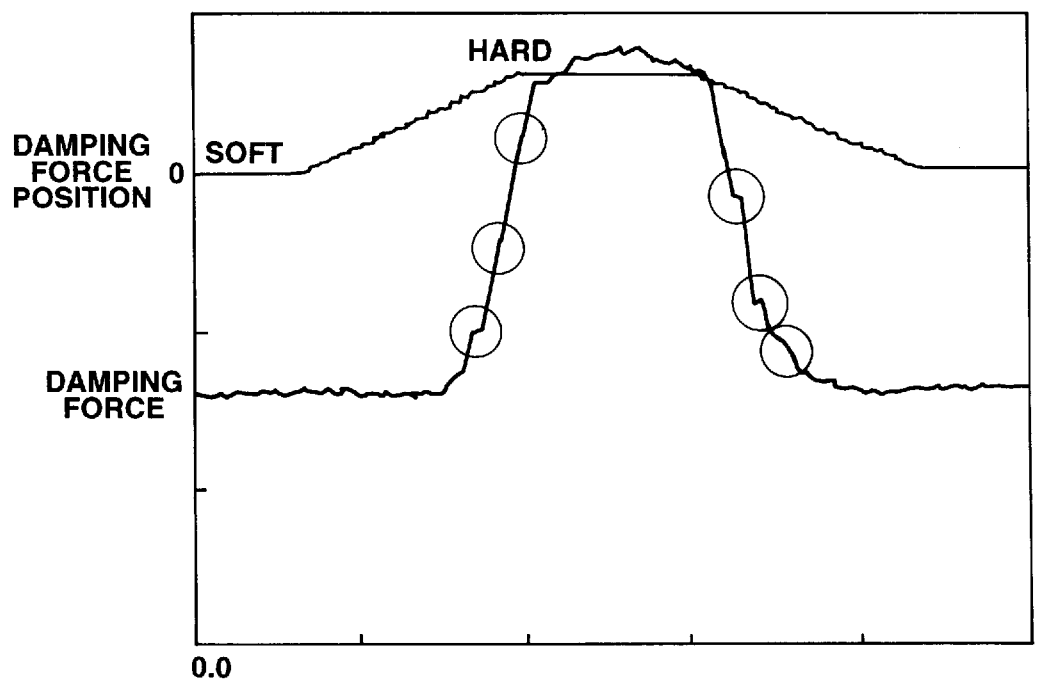
FIG. 6A shows the damping force waveforms obtained according to the conventional step motor driving method.
Figure 6B:
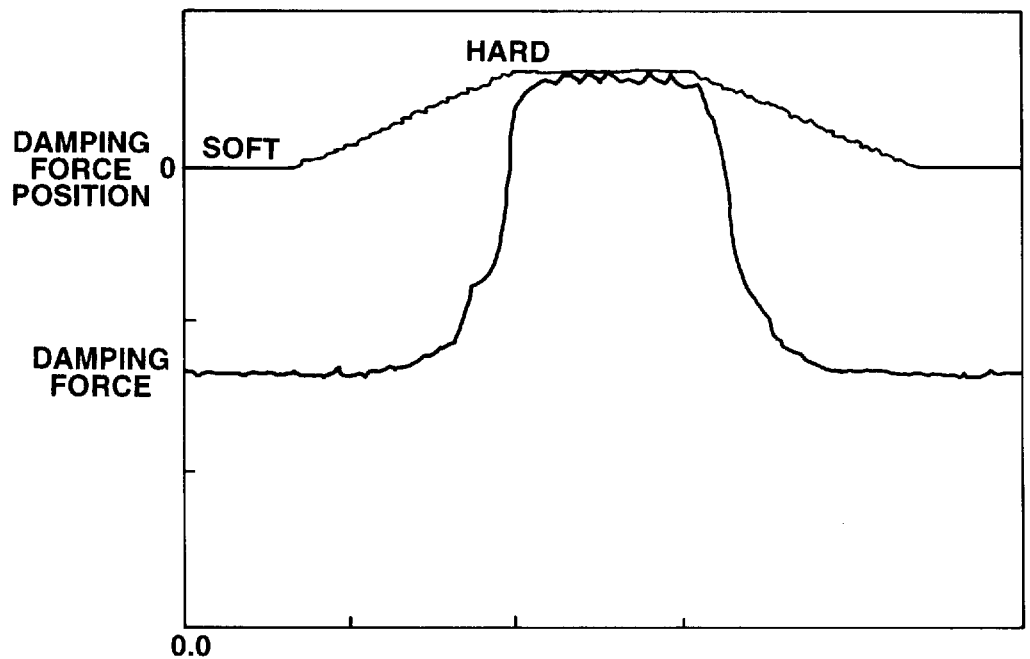
FIG. 6B shows the damping force waveforms obtained according to the step motor driving method of the invention.

FIG. 4A shows the basic drive pattern which defines step drive signal on-duty ratio changes specified for the respective phases A, A', B and B' of the step motor 3, and FIG. 4B shows the corresponding waveforms of the step drive signals produced for the respective phases A, A', B and B' of the step motor 3. The basic drive pattern defines on-duty ratios (%) of 0%, 38%, 71%, 92%, 100% for the respective step periods of time. That is, the on-duty ratio of the step drive signal is changed in four steps between 0% to 100%. The step drive signal on-duty ratio is increased in steps from 0% for the A phase of the step motor 3 and it is decreased in steps from 100% for the B phase of the step motor 3. In the illustrated case, the sampling period is 6.66 ms and the chopping frequency is 4 KHz. As can be seen from FIG. 5A which shows the basic drive pattern on a reduced scale, the step drive signal on-duty ratio changes are approximated by a sine wave and the step drive signal on-duty ratio changes specified for the B phase of the step motor 3 is phase displaced by 90 electrical degrees with respect to the step drive signal on-duty ratio changes specified for the A phase of the step motor 3. The length of the step period of time is reduced to one-fourth of that obtained in the conventional step motor driving method. This is effective to reduce vibrations to a great extent during step motor operation. FIG. 6A shows damping force waveforms obtained when the step motor 3 is driven according to the conventional method, and FIG. 6B shows damping force waveforms obtained when the step motor 3 is driven according to the method of the invention. As can be seen from a comparison of FIGS. 6A and 6B, the step motor driving method of the invention can eliminate the disorder on the damping force waveforms of FIG. 6A.

Figure 7:
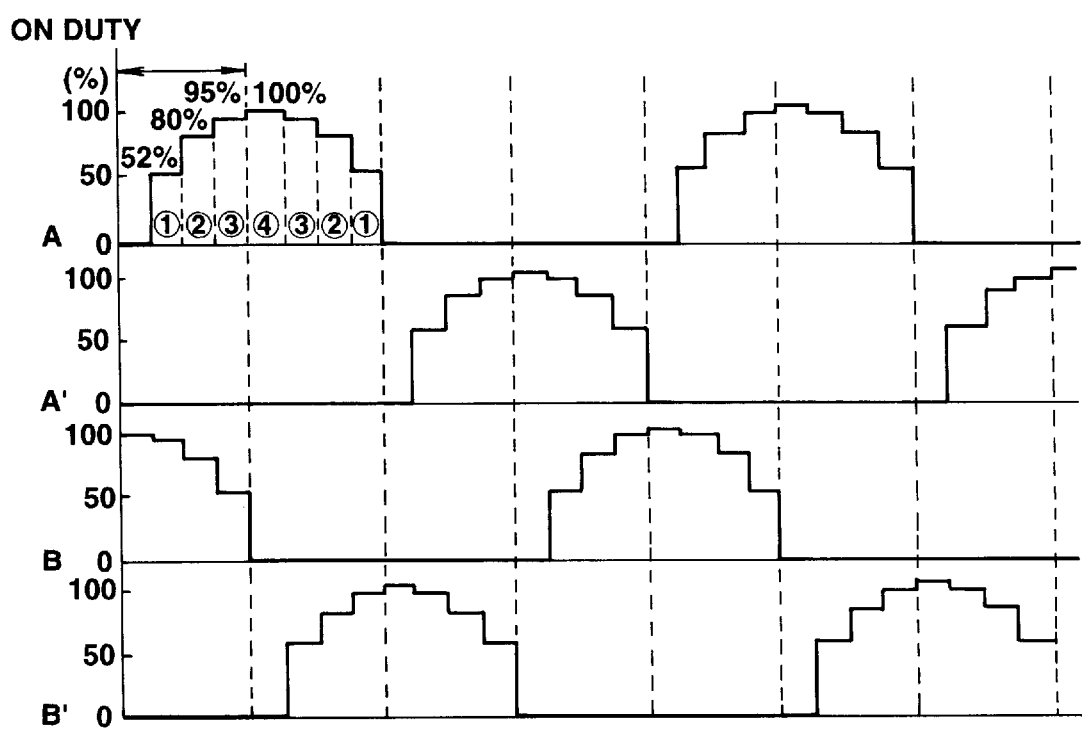
FIG. 7 is a graph showing step drive signal on-duty ratio specified in a first corrected drive pattern for the respective step periods of time.

FIG. 7 shows the first corrected drive pattern which defines step drive signal on-duty ratio changes specified for the respective phases A, A', B and B' of the step motor 3. The first corrected drive pattern specifies on-duty ratios (%) of 0%, 52%, 80%, 95%, 100% for the respective step periods of time. That is, the on-duty ratio of the step drive signal is changed in four steps between 0% to 100%. The step drive signal on-duty ratios specified for the respective step periods of time are greater in the first corrected drive pattern than in the basic drive pattern to bring the drive pattern closer to a square wave. This is effective to increase the average value of the drive current supplied to the step motor 3 during each of the step periods of time so as to compensate for a torque drop which would occur when the supply voltage drops. It is, therefore, possible to eliminate the possibility of erroneous step motor operation resulting from a supply voltage drop during the PWM control for the step drive signal.

Figure 8:
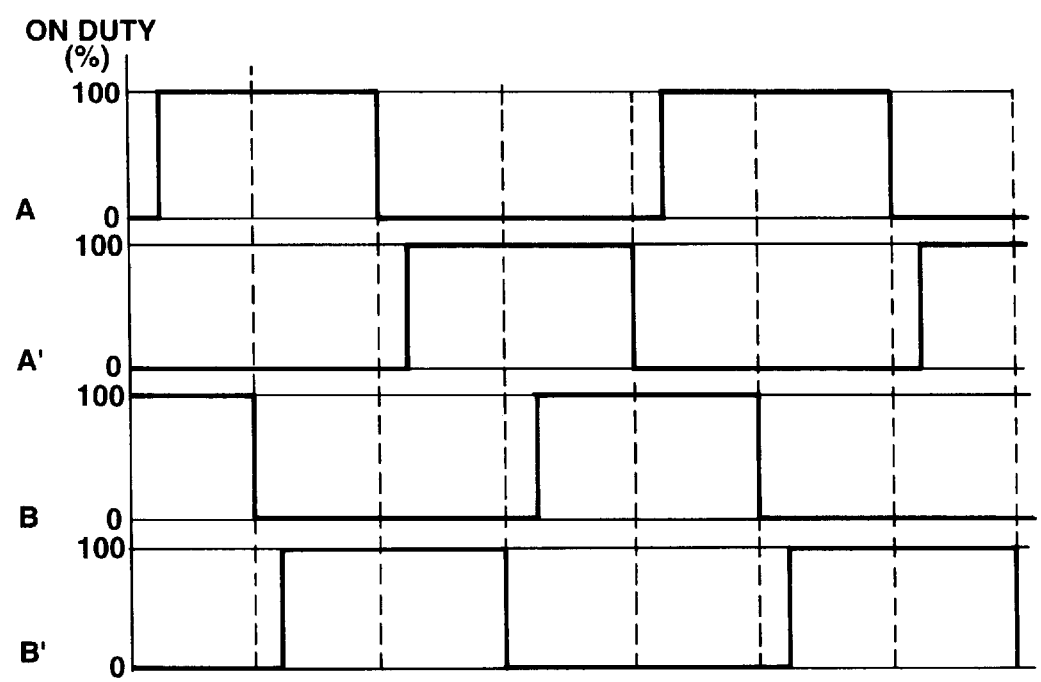
FIG. 8 is a graph showing step drive signal on-duty ratio specified in a second corrected drive pattern for the respective step periods of time.
Figure 9:
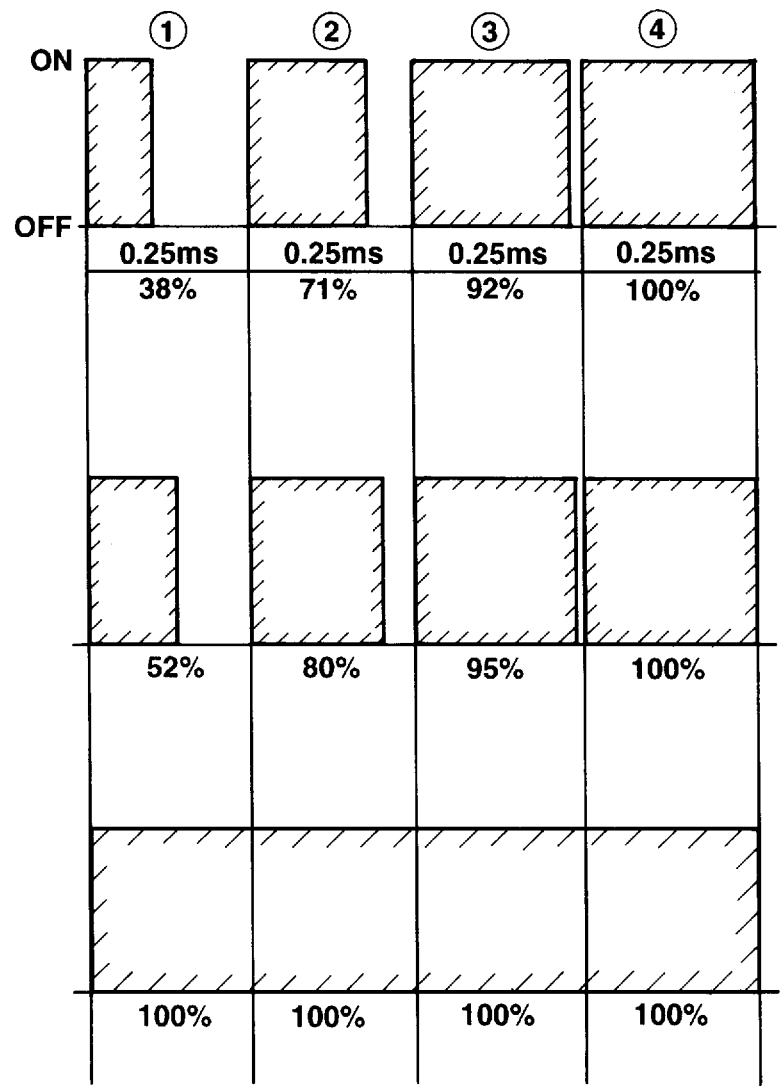
FIG. 9A is a graph showing the step drive signal on-duty ratios specified in the basic drive pattern for the respective step periods of time.
FIG. 9B is a graph showing the step drive signal on-duty ratios specified in the first corrected drive pattern for the respective step periods of time.
FIG. 9C is a graph showing the step drive signal on-duty ratios specified in the second corrected drive pattern for the respective step periods of time.

FIG. 8 shows the second corrected drive pattern which defines step drive signal on-duty ratio changes specified for the respective phases A, A', B and B' of the step motor 3. The second corrected drive pattern specifies an on-duty ratio (%) of 100% for all of the step periods of time so as to interrupt the PWM control made for the step drive signal in the PWM control circuit 12d. This is effective to further increase the average value of the drive current supplied to the step motor 3 during the step periods of time so as to compensate for a greater torque drop which would occur with a greater supply voltage drop. It is, therefore, possible to eliminate the possibility of erroneous step motor operation resulting from a supply voltage drop during the PWM control for the step drive signal.

The central processing unit 12b may be arranged to calculate the step drive signal on-duty ratios for the respective step periods of time from a table programmed thereinto. The look-up table is shown in FIG. 10 and it defines the step drive signal on-duty ratio (%) as a function of step time period P and supply voltage V, as shown in FIG. 10. Assuming now that the detected supply voltage V is in the range of 10 volts to 11 volts, the step drive signal on-duty ratio is 60% for the first step period of time, 83% for the second step period of time, 94% for the third step period of time and 100% for the fourth step period of time.

Alternatively, the central processing unit 12b may be arranged to calculate the step drive signal on-duty ratios from the following equations:

$$D_1 = -K_1 \cdot V + \alpha \tag{1}$$

$$D_2 = -K_2 \cdot V + \beta \tag{2}$$

$$D_3 = -K_3 \cdot V + \gamma \tag{3}$$

$$D_4 = 100 \tag{4}$$

where $\alpha$, $\beta$ and $\gamma$ are basic constants and $K_1$, $K_2$ and $K_3$ are constants dependent on the supply voltage V. These constants are set in a manner to achieve the step drive signal on-duty ratio varying characteristics as shown in FIG. 11.

Although the invention has been described in connection with seven step periods of time into which the half cycle of the step drive signal is divided, it is to be noted that the invention is not limited in any way to such a division. For example, the half cycle of the step drive signal may be divided into eleven step periods of time, as shown in FIG. 12. In this case, the sampling period is 5 ms and the chopping frequency is 8 KHz. It is possible to achieve smoother operation of the step motors 3 by increasing the number of step periods of time into which the cycle of the step drive signal is divided.

While the invention has been described in conjunction with specific embodiments thereof, it is evident that many alternatives, modifications and variations will be apparent to those skilled in the art. For example, the step motors may be of the type other than the unipolar 4-phase driven 2—2 phase excitation type. Accordingly, it is intended to embrace all alternatives, modifications and variations that fall within the scope of the appended claims.

What is claimed is:

1. A method for driving at least one step motor, comprising the steps of:

with an electric circuit operable on a supply voltage applied thereto for generating a step drive signal having a variable on-duty ratio to drive the step motor, performing a PWM control to chance the step drive signal on-duty ratio;

monitoring the supply voltage to detect a drop in the supply voltage; and controlling the step drive signal on-duty ratio in response to detection of a supply voltage drop, wherein the step of performing a PWM control includes the steps of:
      dividing each half cycle of the step drive signal into a plurality of step periods of time; and
      calculating an on-duty ratio of the step drive signal to drive the step motor during each of the step periods of time, and wherein the step of calculating an on-duty ratio of the step drive signal includes the steps of:
      selecting one of a plurality of drive patterns based on the monitored supply voltage, each of the drive patterns defining a step drive signal on-duty ratio for each of the step periods of time;
      calculating the step drive signal on-duty ratio according to the selected drive pattern for each of the step periods of time; and applying the step drive signal to drive the step motor at the calculated on-duty ratio.

2. The step motor driving method as claimed in claim 1, wherein the drive patterns includes a first drive pattern specifying step drive signal on-duty ratios for the respective step periods of time in a form approximated by a sine wave, a second drive pattern specifying step drive signal on-duty ratios greater than those specified in the first drive pattern for the respective step periods of time, a third drive pattern specifying step drive signal on-duty ratios greater than those specified in the second drive pattern for the respective step periods of time, and wherein the step of selecting one of a plurality of drive patterns includes the steps of selecting the first drive pattern when the monitored supply voltage is equal to or greater than a first predetermined value, the second drive pattern when the monitored supply voltage is less than the first predetermined value and equal to or greater than a second predetermined value less than the first predetermined value, the third drive pattern when the monitored supply voltage is less than the second predetermined value.

3. An apparatus for driving at least one step motor, comprising:

an electric circuit operable on a supply voltage applied thereto and configured to generate a step drive signal having a variable on-duty ratio to drive the step motor, said electric circuit configured to perform a PWM control to change the step drive signal on-duty ratio;

a monitoring circuit connected to the supply voltage and configured to monitor the supply voltage so as to detect a drop in the supply voltage and to output a detected drop signal as a result thereof; and a step drive control circuit connected to the monitoring circuit and configured to control the step drive signal on-duty ratio in response to reception of the detected drop signal, wherein the step drive control circuit is configured to divide each half cycle of the step drive signal into a plurality of step periods of time, and to calculate an on-duty ratio of the step drive signal to drive the step motor during each of the step periods of time, and wherein the step drive control circuit calculates an on-duty ratio of the step motor by (1) selecting one of a plurality of drive patterns based on the monitored supply voltage, each of the drive patterns defining a step drive signal on-duty ratio for each of the step periods of time, (2) calculating the step drive signal on-duty ratio according to the selected drive pattern for each of the step periods of time, and (3) applying the step drive signal to drive the step motor at the calculated on-duty ratio.

\* \* \* \* \*